((12) United States Patent
Bocquet et al.

(10) Patent No.: US 8,393,901 B2
(45) Date of Patent: Mar. 12, 2013

(54) GROUP OF FLIGHT SIMULATORS AND ASSOCIATED STRUCTURE

(75) Inventors: Philippe Bocquet, Brax (FR); Brice Miquel, Tournefeuille (FR)

(73) Assignee: Airbus Operations SAS, Toulouse (FR)

( * ) Notice: Subject to any disclaimer, the term of this patent is extended or adjusted under 35 U.S.C. 154(b) by 1296 days.

(21) Appl. No.: 12/050,421

(22) Filed: Mar. 18, 2008

(65) Prior Publication Data

US 2008/0241801 A1 Oct. 2, 2008

(30) Foreign Application Priority Data

Mar. 30, 2007 (FR) .................................... 07 54190

(51) Int. Cl.
*G09B 19/16* (2006.01)
(52) U.S. Cl. .......................................................... 434/30
(58) Field of Classification Search .............. 434/29, 434/30, 33, 34, 37, 46, 55, 58, 61, 62
See application file for complete search history.

(56) References Cited

U.S. PATENT DOCUMENTS

| | | | | |
|---|---|---|---|---|
| 3,829,988 A | * | 8/1974 | Burny | 434/58 |
| 4,019,261 A | * | 4/1977 | Pancoe | 434/58 |
| 4,207,687 A | * | 6/1980 | Haas et al. | 434/49 |
| 5,009,598 A | * | 4/1991 | Bennington | 434/30 |
| 5,791,903 A | * | 8/1998 | Feuer et al. | 434/38 |
| 5,865,624 A | * | 2/1999 | Hayashigawa | 434/66 |
| 6,813,595 B2 | * | 11/2004 | Edgar | 703/8 |
| 6,902,402 B2 | * | 6/2005 | McClintic | 434/30 |
| 7,168,369 B2 | | 1/2007 | Bocquet et al. | |
| 2003/0180693 A1 | * | 9/2003 | Mulder et al. | 434/58 |
| 2004/0265111 A1 | * | 12/2004 | Bocquet et al. | 414/744.1 |

FOREIGN PATENT DOCUMENTS

| | | |
|---|---|---|
| EP | 1 460 606 | 9/2004 |
| GB | 2 091 193 | 7/1982 |
| WO | WO 01/69574 | 9/2001 |

OTHER PUBLICATIONS

Dean P. Giovannetti, "High-Fidelity Motion Simulator Rapid Cockpit Implementation Demonstrated Using a Blackhawk Configuration", Aug. 5-8, 2002, Monterey, California, pp. 1-6, XP-002459700 (AIAA 2002-4795).

NLR Flight Division, "Flight Simulation Facilities", Jan. 5, 2007, pp 1-4, XP-002459701.

\* cited by examiner

*Primary Examiner* — Kurt Fernstrom
(74) *Attorney, Agent, or Firm* — Oblon, Spivak, McClelland, Maier & Neustadt, L.L.P.

(57) ABSTRACT

A system includes a plurality of flight simulators provided with a plurality of control posts and at least one display, wherein at least one control post is movable from a first fixed station to a mobile station.

13 Claims, 9 Drawing Sheets

GROUP OF FLIGHT SIMULATORS AND ASSOCIATED STRUCTURE

BACKGROUND OF THE INVENTION

1. Field of the Invention

The present invention relates to a group of flight simulators and an associated structure.

2. Discussion of the Background

In the field of aeronautics, and more particularly aircraft construction, a flight simulator is generally provided on the one hand with a cockpit reproducing to full scale an airplane pilot post and on the other hand with a system for visualization of the outside environment, otherwise known as the display, mounted to face the cockpit. The display is equipped with a screen, on which there are projected synthetic images generated by a computer as a function of maneuvers performed by the users located in the cockpit.

Document EP 1460606 or U.S. Pat. No. 7,168,369 discloses a device making it possible to move such a display from one cockpit to another. This device therefore makes it possible to move a large mass of several tons between the various cockpits. Each cockpit is disposed at a predetermined location, in the prior art documents also known as a working post. In these prior art documents, each cockpit is fixed and only the display is movable.

In order to design new aircraft, however, it is also preferable to use flight simulators mounted on hydraulic jacks. These simulators then reproduce the movement of the cockpit as close as possible to the real movements of the cockpit of an aircraft in flight.

SUMMARY OF THE INVENTION

The object of the present invention is then to provide a new group of flight simulators in which a plurality of cockpits can be disposed on a mobile platform. A problem to be solved is to limit the cost of such a group of flight simulators.

To this end, the invention proposes a group of flight simulators equipped with a plurality of control posts and at least one display.

According to the present invention, at least one control post can be moved from a fixed first station to a mobile station.

In this way, a given control post can be tested under conditions of a fixed post and of a mobile post. For a given version of a cockpit, therefore, there is no need to provide one unit at a fixed post and another at a mobile post.

In one advantageous embodiment, a control post is mounted on a deck and is electrically connected to the outside by way of at least one connecting interface. These means make it possible to facilitate the movement of a pilot post. To limit the forces during such a movement, it is proposed that at least one control post be mounted on air cushions.

A group of simulators according to the invention is provided, for example, with a plurality of fixed stations, each equipped with a movable control post, at least one mobile station being provided with a platform mounted on jacks as well as with a bridge crane equipped with a trolley making it possible to achieve guidance of each movable control post. This structure makes it possible to limit the floor space occupied in the test center containing the flight simulators.

For moving the control posts, a group of simulators according to the present invention is provided, for example, with a mobile structure having means for lifting a control post. In this embodiment, the mobile structure is provided, for example, with an exterior chassis mounted on air cushions as well as with a chassis movable in translation relative to the exterior chassis and equipped with means for grasping a control post.

In a group of simulators such as described in the foregoing, one display may be dedicated to each mobile station and at least one display may be shared among a plurality of fixed stations. This also makes it possible to limit the costs of the group of simulators.

As regards the electrical connections, each fixed station that accommodates a movable control post is connected, for example, to an operating room, and an extension is provided between each of the said fixed stations and the mobile station.

The present invention also relates to a method for development of aircraft cockpits, characterized in that it comprises the following steps:

construction of at least one cockpit on a deck disposed on a fixed station of a research and design center, movement of the cockpit from the fixed station to the mobile station, performance of tests and simulations on the mobile station, and return of the cockpit to the fixed station.

BRIEF DESCRIPTION OF THE DRAWINGS

Details and advantages of the present invention will become clearer from the description hereinafter, provided with reference to the attached schematic drawings, wherein:

FIGS. 5 to 9 are taken from document EP 1460606 and adapted.

DETAILED DESCRIPTION OF THE PREFERRED EMBODIMENTS

Figure 1:
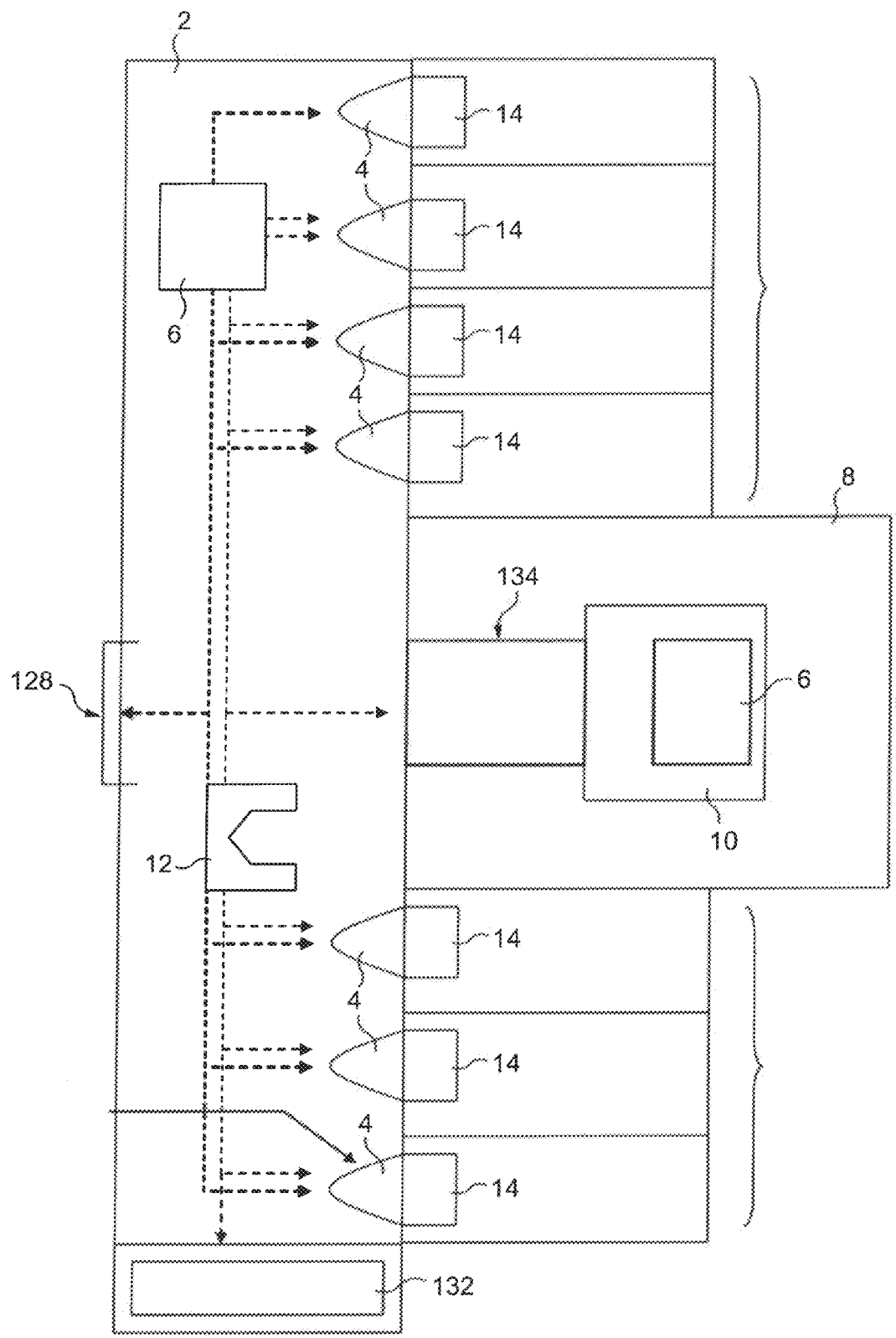
FIG. 1 schematically represents an overhead view of a group of flight simulators according to the invention.

FIG. 1 is a schematic plan view of a building 2, inside which there is disposed a plurality of flight simulators.

Each of these flight simulators is provided on the one hand with an airplane cockpit 4 and on the other hand with a display 6.

FIG. 1 shows seven control posts, referred to hereinafter as airplane cockpits 4, and two displays 6. These displays are mobile, and can be moved into positions in front of each of airplane cockpits 4 represented in this FIG. 1.

At substantially the center of building 2, there is provided a hall 8 to accommodate a mobile platform 10. The latter is mounted on six hydraulic jacks, in such a way that mobile platform 10 has six degrees of freedom. It is already known in the field of flight simulation that such a structure associating a platform and jacks can be used to recreate sensations (acceleration) approaching reality for the person using the simulator. Mobile platform 10 is therefore equipped to receive a display 6 and a cockpit 4. According to a preferred embodiment, one display 6 remains stationary on mobile platform 10, while the other display 6 is moved in building 2 as explained hereinafter.

Figure 4:
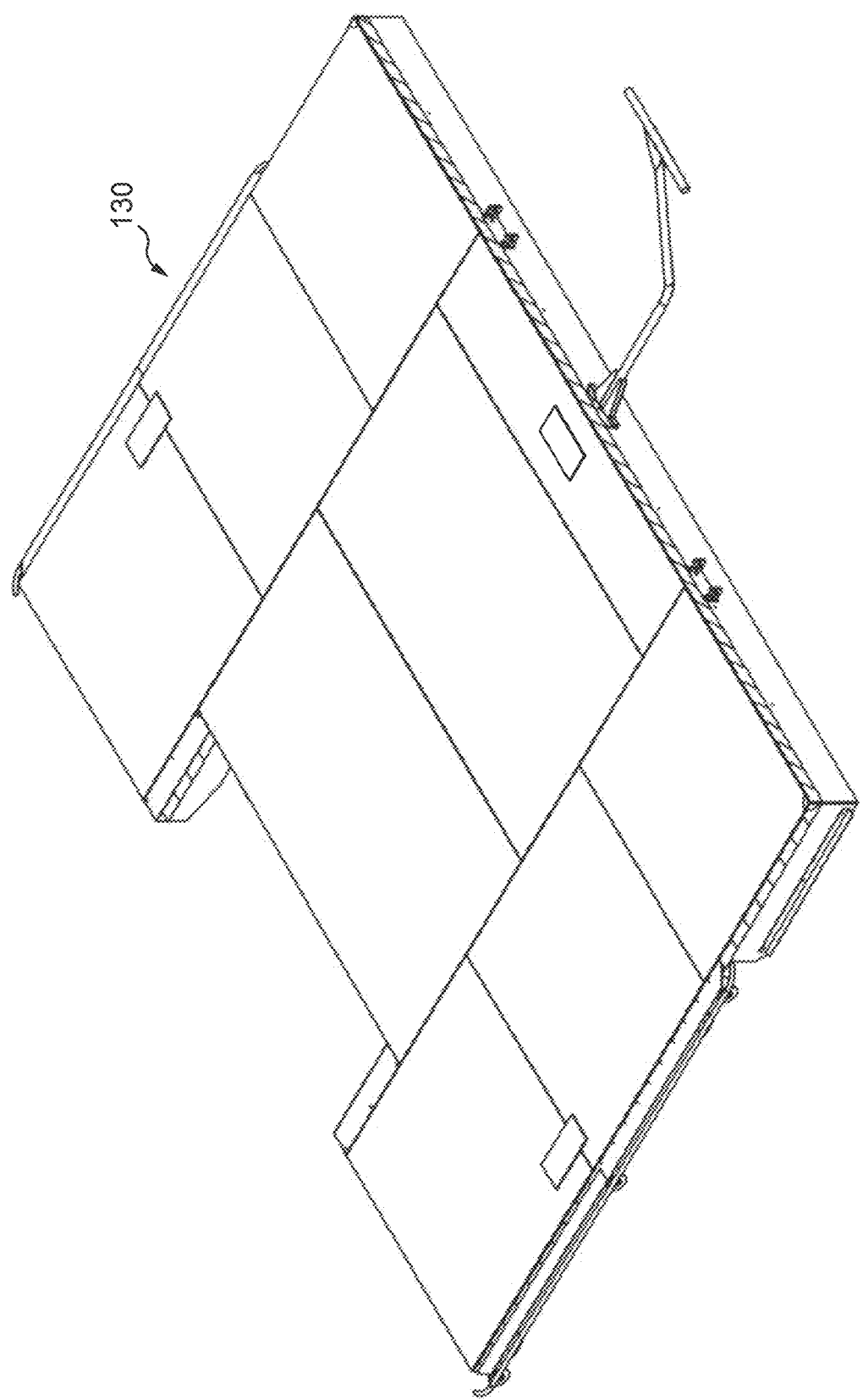
FIG. 4 represents a perspective view of a movable pallet for implementation of the present invention.

Each display 6 is the same type, for example, as the display described in document EP 1460606 and represented in FIG. 4 of that document. This display 6, not represented in detail in the present patent application, is therefore provided in particular with a mirror fixed on an outer wall and with projectors for projecting an image on the said mirror. It has the appearance of a substantially semicylindrical room having an opening at the rear to permit introduction of a cockpit 4. Once display 6 is positioned relative to a cockpit 4, a person seated in the said cockpit at the place of the pilot or copilot sees the mirror through the windows of this cockpit 4. The image projected by the projectors onto a diffuser screen is in turn projected onto the mirror. As an example, this appears to have the form of a sphere portion extending over approximately 200° in azimuth and over a sufficient elevation on the order of 60°, in such a way as to cover the entire field of vision of a pilot or copilot seated at his place in cockpit 4 and looking through the windows of the said cockpit. Calculators associated with display 6 drive the projectors and generate the image that they project, in such a way that this image corresponds to the received piloting instructions and also in such a way that the pilot and copilot see on the screen a faithful reproduction of what they would see if they were on board an airplane. Such a display 6 is of known type and will not be described in further detail here.

Mobile display 6, for example, is mounted on a structure such as that described and claimed in document EP 1460606. This is an air-cushion structure that is not described in detail here. For that, reference is made to the cited prior art document.

Figure 2:
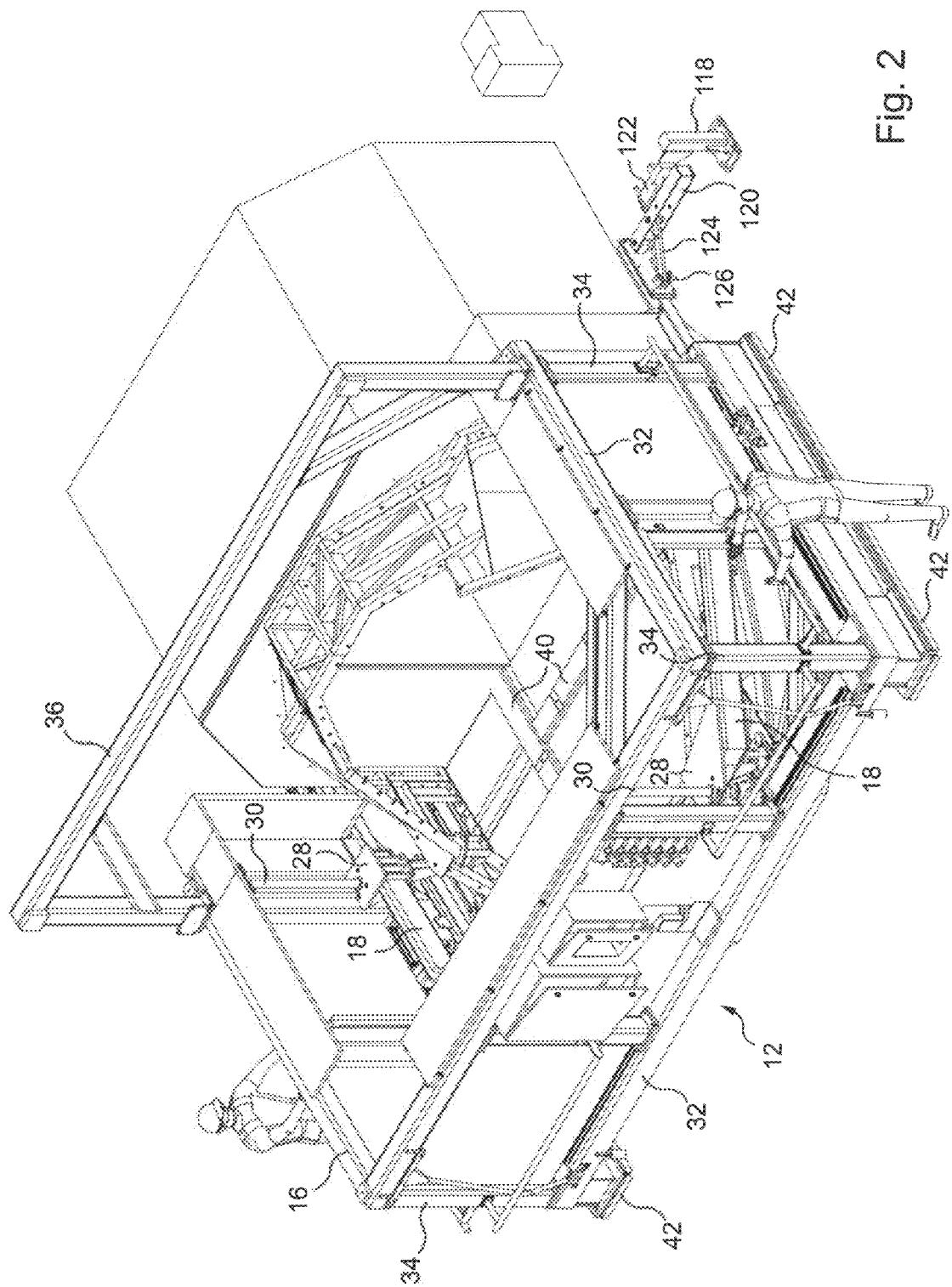
FIG. 2 is a perspective view of a structure with which a simulator cockpit can be moved.

In original manner, cockpits 4 can be moved. A structure 12 represented in FIG. 2 is used for such a movement.

In FIG. 1, all cockpits 4 are disposed at a fixed post 14. When they are in the position represented in this FIG. 1, the cockpits are immobile. Structure 12 is then intended to grasp at least one of these cockpits 4 and then to move them so as to transport them onto mobile platform 10. Structure 12 is provided with an external chassis 16, inside which there is mounted a mobile chassis 18, movable in vertical translation, represented in more detail in FIG. 3.

Figure 3:
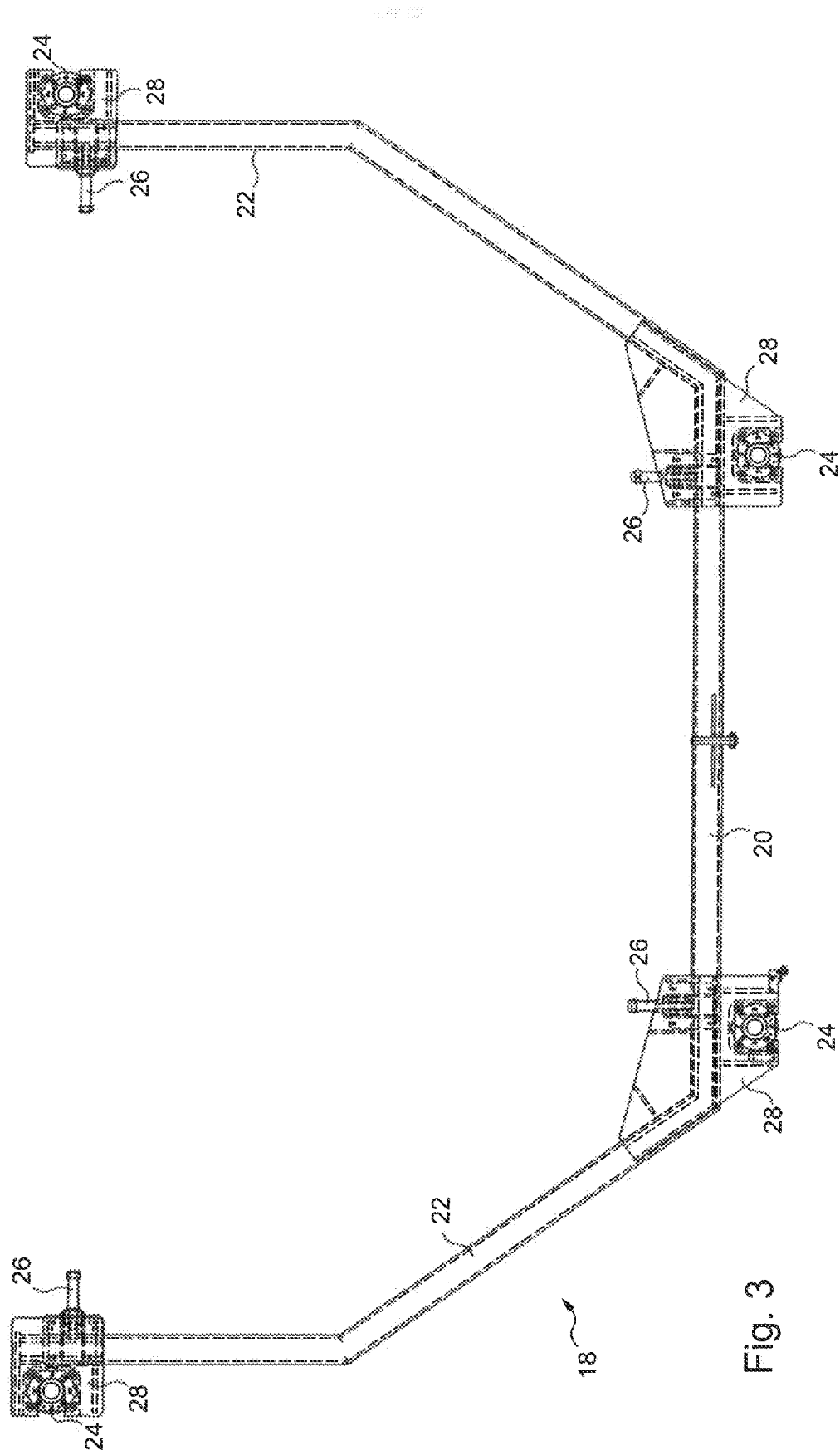
FIG. 3 represents an overhead view of part of the structure of FIG. 2.

Mobile chassis 18 of FIG. 3 is U-shaped overall as viewed from above. It is a metal chassis made, for example, by welding steel tubes. This mobile chassis 18 is provided with a base 20 and two elbowed branches 22. At each free end of elbowed branches 22 and also at the ends of base 20 next to elbowed branches 22 there are disposed both a nut 24 and a pin 26.

Each nut 24 is fixed perpendicularly to a horizontal platen 28. This nut 24 is intended to cooperate with a threaded rod 30 mounted vertically on external chassis 16.

Pin 26 in turn is fixed on mobile chassis 18 in such a way that it extends horizontally. Each pin 26 is intended to cooperate with a catch (not illustrated) associated with a cockpit 4.

External chassis 16 itself also appears U-shaped when viewed from above. In this case, however, there are disposed two U-shaped members 32 constructed, for example, by means of tubular metal beams welded to one another, the two U-shaped members 32 being disposed in horizontal planes and connected by vertical columns 34.

Threaded rods 30 mentioned in the foregoing and cooperating with nuts 24 are mounted vertically between the two U-shaped members 32 of structure 12. An electric motor (not illustrated) is mounted on external chassis 16, for example on the lower U-shaped member, at the center of the base thereof, and it drives the four threaded rods 30 by an appropriate transmission.

Mobile chassis 18 is mounted on external chassis 16 by way of nuts 24 in engagement with threaded rods 30. When the electric motor is actuated, threaded rods 30 are caused to rotate, thus inducing a translational ascending or descending movement of mobile chassis 18.

Thus, when mobile chassis 18 is in its low position and when structure 12 surrounds a cockpit 4 as represented, for example, in FIG. 2, pins 26 of the mobile chassis become positioned facing the catches of cockpit 4. The motor is then actuated to mount mobile chassis 18. Pins 26 then carry cockpit 4 and lift it.

As can be seen in FIG. 2, external chassis 16 is also provided with a gantry 36 intended to cooperate with a bridge crane 38, as explained hereinafter.

Each cockpit 4 is mounted on a deck 40 composed of metal beams connected with one another in such a way as to form a support for the corresponding cockpit 4. In addition, cockpit 4 is supplied by numerous connecting cables for its electrical power supply and exchange of data with associated calculators and systems. An interface for all of these connections is provided on deck 40. It is possible to provide a single interface or else a plurality of separate interfaces depending, for example, on the different types of signals exchanged with the outside. In this way, cockpit 4 becomes movable.

Deck 40 and structure 12, or more precisely its external chassis 16, are mounted on air cushions 42. These are supplied with compressed air when the corresponding cockpit 4 and/or structure 12 must be moved.

Figure 7:
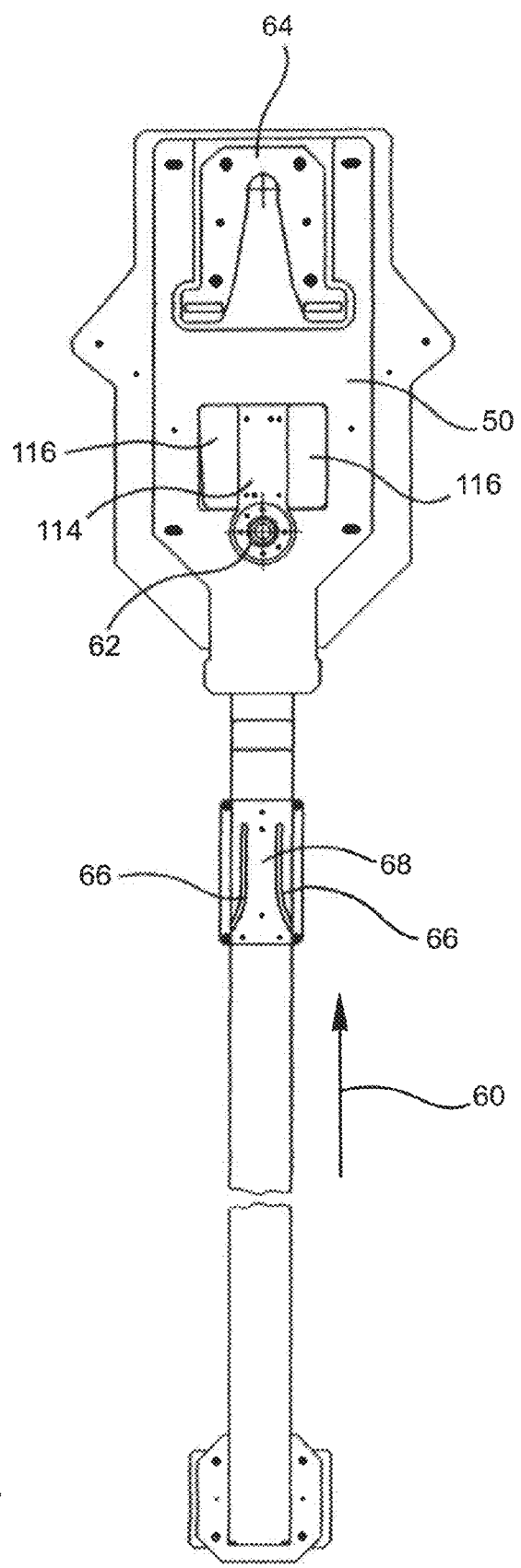
FIG. 7 shows an overhead view of an interface intended to cooperate with a structure such as that represented in FIG. 2.
Figure 8:
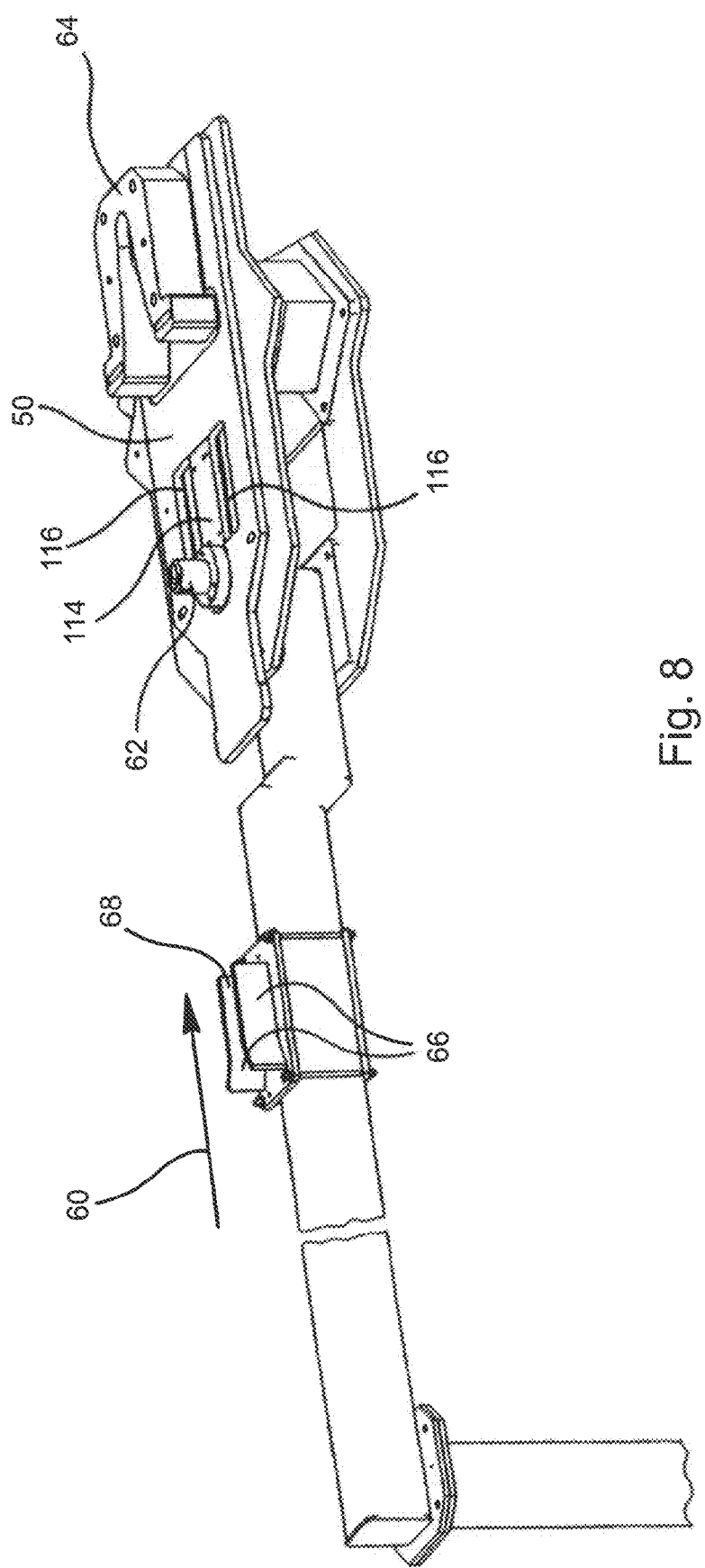
FIG. 8 is a perspective view of the interface of FIG. 7.

Gantry 36 is intended to be equipped with a first interface device 50, represented in overhead view in FIG. 7 and in perspective in FIG. 8. This first interface device 50 makes it possible to form the link between structure 12 and the guiding and moving means (bridge crane 38) described hereinafter.

Figure 5:
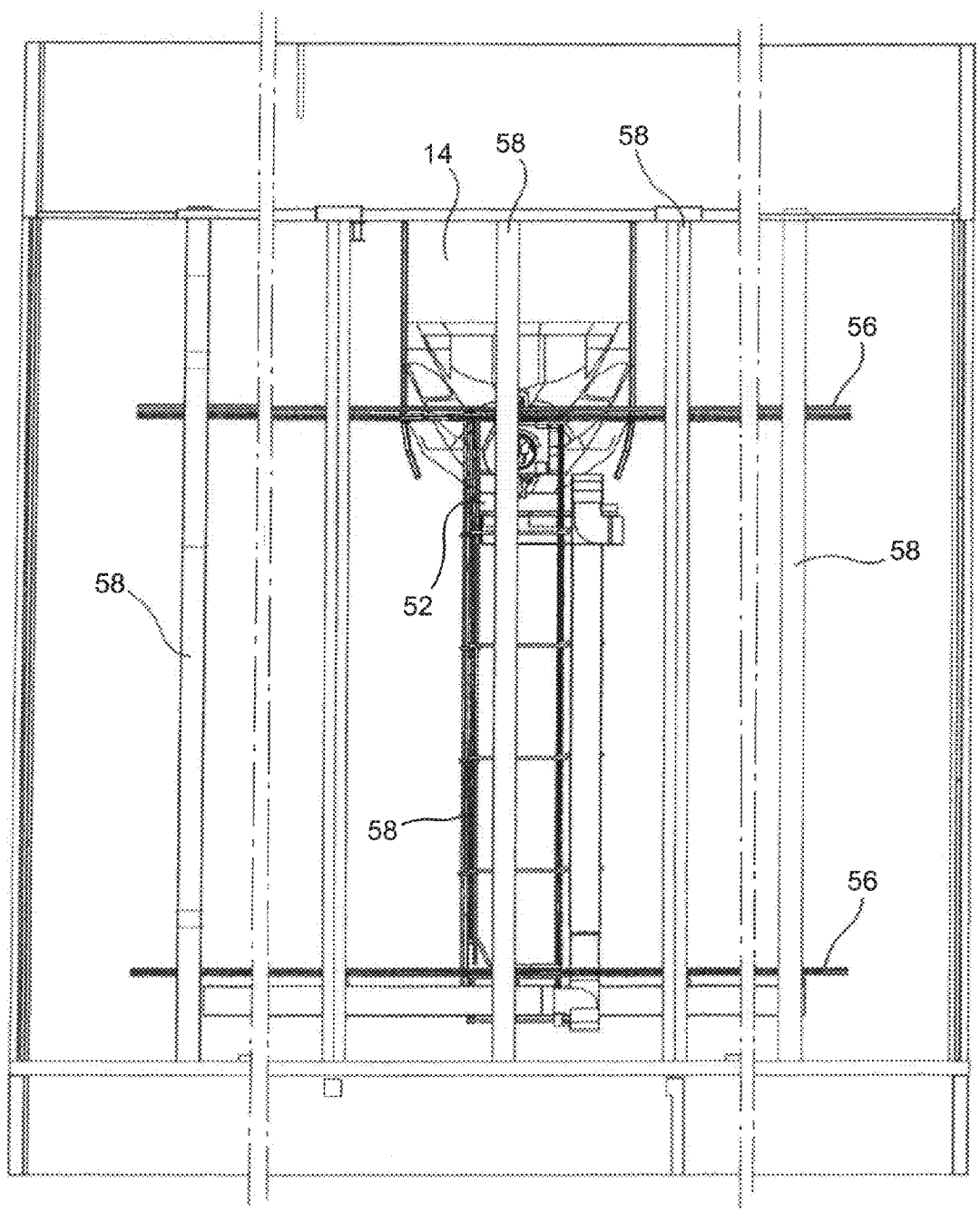
FIG. 5 represents an overhead view of part of a bridge crane used for the present invention.
Figure 6:
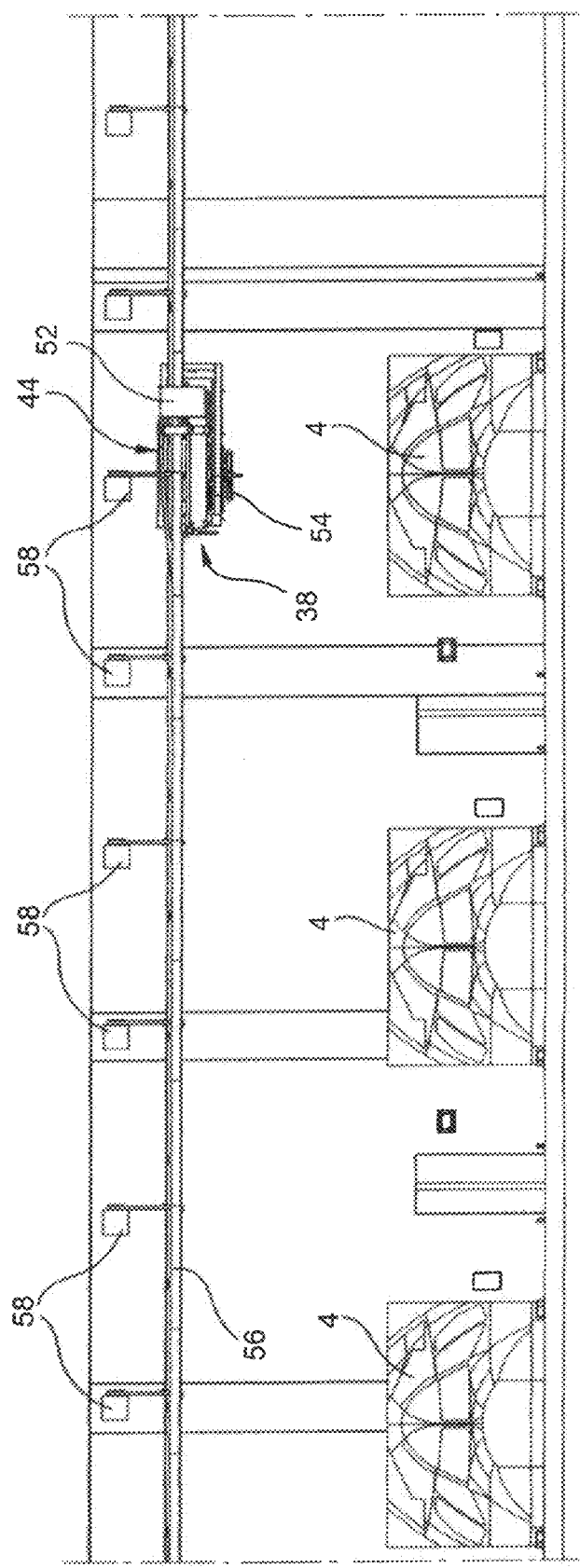
FIG. 6 is a side view of the bridge crane of FIG. 5.
Figure 9:
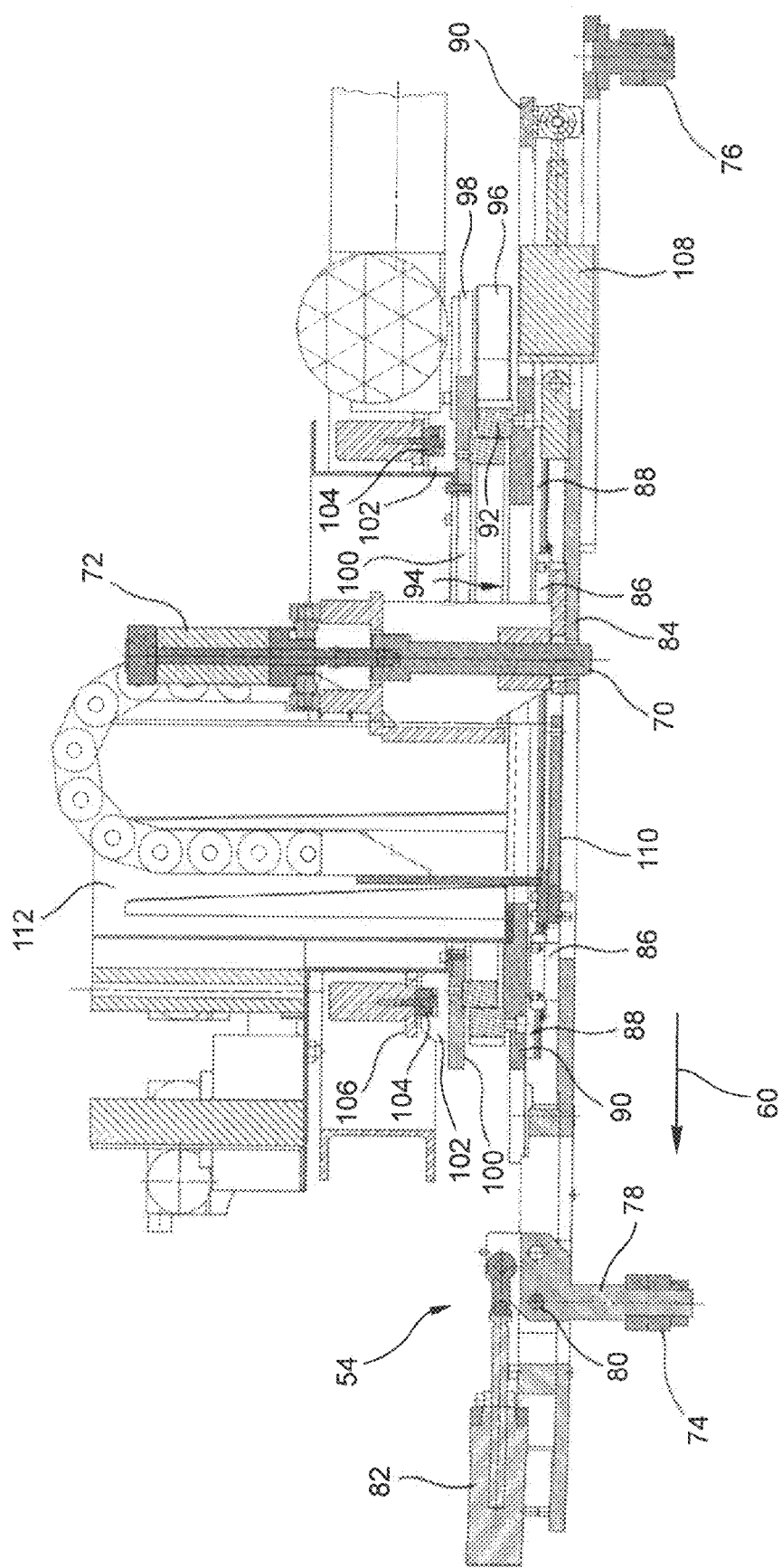
FIG. 9 is a cross-sectional view of the interface of FIGS. 7 and 8 coupled with a trolley of the bridge crane of FIGS. 5 and 6.

FIG. 5 shows an overhead view of bridge crane 38 used to move and guide both mobile display 6 and cockpits 4. FIG. 5 is a partial cutaway view, and on this figure there are represented only the zone of building 2 in which bridge crane 38 is located and the ends of the building. Bridge crane 38 is equipped with a mobile trolley 52. This trolley is moved in a horizontal plane parallel to the floor of building 2 and disposed a few meters thereabove. A second interface device 54 is mounted on trolley 52 (see FIG. 9). This second interface device 54 cooperates with first interface device 50 to achieve mechanical coupling, but also electrical and pneumatic coupling between trolley 52 and cockpit 4.

Bridge crane 38 is suspended on two parallel rails 56 extending substantially over the entire length of the building. These rails 56 are horizontal and suspended on beams 58 of building 2 accommodating bridge crane 38. To ensure that bridge crane 38 moves in a manner that remains indeed perpendicular to rails 56, it is provided that each end of bridge crane 38 is equipped with a system for driving bridge crane 38 relative to the corresponding rail. In addition, for precise indication of the position of bridge crane 38 relative to rails 56 (which are fixed) and therefore relative to building 2, each rail 56 is equipped over its entire length corresponding to the travel distance of bridge crane 38 with a barcode strip. A barcode reading system is mounted facing this strip at each end of bridge crane 38. In this way it is possible at the same time to know the exact position of bridge crane 38 and to determine whether bridge crane 38 is perfectly perpendicular to rails 56. Servo control of the drive devices of the bridge crane by the barcode readers makes it possible to guarantee movement of the bridge crane without distortion.

Trolley 52 of bridge crane 38 is moved thereon perpendicular to rails 56. Here also, for perfect control of the position of trolley 52 relative to the bridge crane, trolley 52 is equipped with a barcode reader, and a barcode strip is fixed on bridge crane 38 in such a way that it faces the corresponding reader over the entire travel distance of trolley 52 on bridge crane 38. The drive system of trolley 52 on bridge crane 38 is a traditional prior art drive system, as is the drive of bridge crane 38 relative to rails 56, and so it will not be described in further detail here.

The mechanical, electrical and pneumatic link between cockpit 4 and trolley 52 of bridge crane 38 are established by first (50) and second (54) interface devices. The mechanical link is established first. Once trolley 52 and structure 12 are rigidly locked together mechanically, the electrical and pneumatic connections are established.

The operations of mechanical and other coupling are performed when structure 12 is immobile. Bridge crane 38 and its trolley 52 are moved in such a way as to search for structure 12 and cockpit 4 carried by this structure. Bridge crane 38 becomes positioned firstly at the height of structure 12, then trolley 52 is moved until it is positioned just above structure 12 and its first interface device 50.

To ensure good guidance and good positioning of the two interface devices 50 and 54, it is provided to have trolley 52 always arrive in the same direction relative to structure 12. This direction is symbolized by an arrow 60 in FIGS. 7 to 9 and is perpendicular to rails 56 of bridge crane 38. Guiding and centering means described hereinafter then permit exact positioning of the two interface devices relative to one another. Once this positioning is achieved, mechanical coupling is established, followed by electrical and pneumatic coupling.

First interface device 50 (FIGS. 7 and 8) is disposed on gantry 36. It comprises firstly a cylindrical bush 62 oriented in such a way that its axis of revolution is vertical. This bush 62 is also disposed in such a way that it is located substantially above the center of gravity of the mobile assembly, which comprises in particular cockpit 4 and structure 12.

First interface device 50 also comprises centering and aligning means, substantially at the same height as bush 62. First there is a V-shaped piece 64. This piece has a symmetry plane aligned in the direction indicated by arrow 60, and the opening of the V is oriented toward bush 62. On the other side of bush 62, aligned with this bush 62 and V-shaped piece 64, there is an aligning assembly formed by two vertical aligning walls 66. These two aligning walls 66 define a horizontal channel 68 extending in the direction indicated by arrow 60. The entry to this channel 68, or in other words its end remote from bush 62, is flared in such a way as to effect guidance toward the interior of channel 68.

Second interface device 54 (FIG. 9) is provided with means complementary to those of first interface device 50 described in the foregoing. It has firstly a bolt 70 having the form of a circular cylindrical bar of shape adapted to the inside of bush 62. The axis of this bolt is disposed vertically, and a jack is provided to move this bolt 70 vertically between a raised unlocked position and a lowered locked position. In its locked position, the lower end of bolt 70 is inside bush 62. The upper opening of the bush is preferably flared to facilitate introduction of bolt 70 into bush 62. In addition the outside diameter of bolt 70 and the inside diameter of bush 62 are adapted so as to limit the play between these two pieces while allowing effortless sliding between them.

Second interface device 54 is also provided with two guiding and aligning rollers. A first roller 74 is intended to cooperate with V-shaped piece 64. The diameter of this first roller 74 corresponds to a rounded shape of V-shaped piece 64, provided at the apex of the V. Second roller 76 is intended to cooperate with aligning walls 66. It is aligned with bolt 70 and first roller 74. Its diameter corresponds substantially to the width of channel 68 in its non-flared portion. When first roller 74 is positioned at the bottom of the V of V-shaped piece 64 and second roller 76 is positioned inside channel 68 between aligning walls 66, bolt 70 is just above bush 62.

To prevent a collision between first roller 74 and bush 62, this first roller 74 is mounted at the end of an arm 78 mounted pivotally around a horizontal pivoting spindle 80, between a position in which arm 78 is substantially vertical and first roller 74 is in lowered position, and a second position in which arm 78 is substantially horizontal and first roller 74 is in raised position. A jack 82 is provided to control pivoting of arm 78 and lowering (or raising) of associated first roller 74.

It is also important that errors in positioning of bridge crane 38 and of trolley 52 while trolley 52 is "searching" for cockpit 4 be prevented. To this end, second interface device 54 is equipped with crossed tables. In this way it is possible to have two degrees of freedom in translation in a horizontal plane for positioning of trolley 52 during guiding and aligning maneuvers preceding coupling of second interface device 54 (associated with structure 12) with trolley 52 by means of bolt 70 and rollers 74 and 76. A third degree of freedom, of rotation around a vertical axis to permit perfect alignment between first (50) and second (54) interface devices, is also provided.

Bolt 70 and rollers 74 and 76 are mounted on a lower horizontal table 84. Bolt 70 is fixed on the upper face of this lower table, but a passage is provided in this lower table 84 for this bolt 70, so that its end responsible for interlocking with first interface device 50 is below lower table 84. The upper face of lower table 84 also carries ball-mounted guide runners 86 or similar components. These runners receive corresponding guide rails 88, which are mounted on a first intermediate table 90. The latter has a toothed crown gear 92 on its upper face. The inner face of this toothed crown gear 92 is smooth and guided, if necessary by way of rolling bearings, on a guide ring 94. The outer toothed face of toothed crown gear 92 engages with a toothed gear 96, likewise positioned in a horizontal plane. This toothed gear 96 is driven by a motor 98 and can cause toothed crown gear 92 to rotate. Motor 98 and guide ring 94 are both fixed on a second intermediate table 100. The latter carries, on its upper face, other guide runners 102 cooperating with other guide rails 104, themselves fixed on an upper table 106. The latter is integral with trolley 52 sliding on bridge crane 38. It is noted in FIG. 9 that guide rails 104 are mounted perpendicularly relative to guide rails 88. This perpendicular disposition permits the use of crossed tables.

While trolley 52 is driving structure 12 and cockpit 4 being carried thereby outside the zone defined by the guide rails on the ground, it is advisable to block the three degrees of freedom left by second interface device 54. Blocking means are used for this purpose. Motor 98 can block free rotation of toothed crown gear 92 around guide ring 94. As regards the degrees of freedom in translation, jacks are used. A first blocking jack 108 is mounted between lower table 84 and first intermediate table 90 to prevent any involuntary translation between these two tables. A second blocking jack, not visible in FIG. 9, makes it possible in the same manner as first blocking jack 108 to block any translation between upper table 106 and second intermediate table 100.

This structure described in the foregoing is identical to that described in document EP 1460606 for achieving the link between the bridge crane and the display described in that document. These means are adopted here for moving display 6, which is preferably moved exactly as described in that prior art document. These means, which are therefore known, are adopted for also achieving movement of a cockpit 4.

During the movement of a display, it is necessary to continue to supply the display with electricity. During the movement of a cockpit 4, only a pneumatic supply is necessary for supplying compressed air to air cushions 42 of structure 12 and of deck 40 carrying the cockpit. However, an electrical coupling must also be provided to permit in particular actuation of the motor for lifting and lowering mobile chassis 18.

When mechanical coupling is established between trolley 52 and structure 12 or else display 6, the electrical and pneumatic connections can be made. A platen 110 carrying all the electrical outlets and one pneumatic outlet is mounted on lower table 84 of second interface device 54. This platen 110, which is disposed in a horizontal plane, is vertically mobile by virtue of a connecting jack 112, which allows it to be moved between a connected lower position and a disconnected upper position. During coupling of structure 12 with bridge crane 38, pneumatic and electrical connections are made. The electrical supply ensures that the motor is supplied, permitting vertical translation of mobile chassis 18 (FIG. 3), as seen hereinabove.

First interface device 50 is provided with a counter-platen carrying the electrical and pneumatic outlets corresponding to the outlets of platen 110. This counter-platen of first interface device 50 is not illustrated on the drawings. Nevertheless, a housing 114 in which there is accommodated this counter-platen and the outlets that it carries is seen in FIGS. 7 and 8. Fixation surfaces 116 for this counter-platen are provided and illustrated on the drawing.

In the same way that display 6 is secured on the floor of building 2 when it is facing a cockpit 4, as illustrated in FIG. 8 of document EP 1460606 and in the corresponding description, structure 12 is secured when it is located facing fixed post 14, as illustrated in FIG. 2. Here it is planned that only mechanical linking means will be used as such securing means.

When a structure 12 is being transported toward a cockpit 4 disposed at a fixed post 14, or when an assembly formed by a structure 12 and a cockpit 4 is being transported by trolley 52, structure 12 becomes positioned relative to two anchoring stanchions 118, one on each side of structure 12 (only one stanchion is visible in FIG. 2). External chassis 16 carries a boom 120 equipped at its end with a manually actuatable bolt 122. Boom 120 is mounted pivotally between a folded position along external chassis 16 and a deployed position illustrated in FIG. 2. Boom 120 can be maintained in these two positions by means of a connecting rod 124 together with a guide pin 126. When boom 120 is in deployed position, it comes to rest against anchoring stanchion 118, and bolt 122 interlocks it therewith.

The device described in the foregoing makes it possible not only to move display 6 from one cockpit 4 to another or if necessary toward a maintenance area 128 but also to move a cockpit 4 in order to bring it from a fixed post 14 to mobile platform 10 or vice versa.

The movement of a display is described in document EP 1460606. Reference is made to that document for explanations concerning the coupling between structure 12 and trolley 52 of bridge crane 38.

Structure 12 is intended here to be positioned in front of fixed posts 14 (the number of which is seven in the present case, shown by way of non-limitative example) but also in front of hall 8 in which the mobile platform is located. The positions in which structure 12 can pick up or deposit a cockpit 4 are therefore predefined very precisely. The guiding means (bridge crane 38) know these positions.

When a structure 12 picks up a cockpit 4, it was seen above how this cockpit 4 was carried by mobile chassis 18 thus permitting it to be extracted from its housing made in the floor of building 2. When cockpit 4 is lifted but is still in place, provisions are made to secure the space to prevent it from being dropped, for example by disposing, under cockpit 4, a mobile pallet 130 mounted on castors and capable of being maneuvered manually by means of a handle. FIG. 4 illustrates such a mobile pallet 130.

Cockpit 4 is then moved by means of structure 12, driven by trolley 52 of bridge crane 38. As an example, it is then taken toward hall 8. Structure 12 is then positioned relative to this hall 8. Mobile chassis 18 is lowered again and structure 12 is withdrawn. As an example, it may be positioned in a storage zone 132. It may also be replaced in the location occupied by cockpit 4 that has just been moved. In effect, at this place, the structure secures the zone left free by displaced cockpit 4, by preventing access to this zone.

Once structure 12 has been withdrawn, cockpit 4 is moved toward mobile platform 10. It is recalled here that cockpit 4 is mounted on a deck 40, which itself is mounted on air cushions. Cockpit 4 can then be displaced manually. To transfer it onto mobile platform 10, provisions are made, for example, to transfer it onto an elevator platform 134. This platform is brought to floor level of building 2 in order to receive cockpit 4, then to the level of mobile platform 10, so that cockpit 4 can finally be transferred onto this mobile platform 10. Elevator platform 134 can then be withdrawn, for example by being completely lowered so that it does not interfere with the movements of mobile platform 10 during a flight simulation.

Removal of a cockpit 4 from mobile platform 10 and repositioning it at a fixed post 14 are achieved by operating in the inverse manner.

When cockpit 4 is positioned in a fixed post 14, it is connected to an operating room by cables for data exchange. When it is disposed on mobile platform 10, it is also connected to the operating room. As an example, an extension then is used for connecting cockpit 4 to the operating room. This extension then leads out of the mobile platform, to return to fixed post 14 corresponding to cockpit 4 located on this mobile platform, to then be connected to the operating room.

When new connections are made, a series of tests is then performed to verify the connections in order to avoid damaging the electrical equipment located in cockpit 4.

The movement device described hereinabove is capable of moving a very large mass (the assembly formed by structure 12 and a cockpit 4 weighs several tons) without taking up floor space. Only a few guide rails are preferably provided close to the locations at which the mass must be stopped. It must be observed that these guide rails are optional, especially if at least one stop is equipped with centering means.

The described embodiment is advantageous, because it permits movement with great precision. In addition, the adopted solution obviates the need for electrical cables that move together with the bridge crane and its trolley.

In this new embodiment, it is possible to move a display and cockpits simultaneously with the same guide structure (it is understood that a plurality of mobile displays can also be handled).

Movement of the cockpits is particularly advantageous, because the same cockpit can be used for simulations at a fixed post and for simulations on a mobile platform. It is clear that the costs for development of a new aircraft can be limited. In fact, there is no need to provide two cockpits with similar configurations for each situation, one for a mobile platform and one for a fixed post. Similarly, the use of a mobile platform, which is a complex and costly device, can be optimized, because a cockpit can be developed at a fixed post then tested on a mobile platform, which is then not immobilized during the time that modifications are being made to the developed cockpit.

The present invention is not limited to the embodiment described hereinabove by way of non-limitative example. It also relates to all alternative embodiments conceivable by the person skilled in the art within the scope of the claims hereinafter.

For example, the means for placing in suspension are not necessarily air cushions. It is conceivable to have magnetic suspension.

The fact that aerial guiding means are provided makes it possible to free up the building floor to facilitate access thereto and to avoid interference with possible traffic. However, it is conceivable to have a tractor vehicle to pull and/or push the load to move it from one location to another.

Other mechanical connecting and coupling devices can be conceived for a movement device according to the present invention. The described embodiments are preferred embodiments given by way of non-limitative examples.

The invention claimed is:

1. A flight simulator system, comprising:
a plurality of control posts, each control post being an aircraft cockpit;
a plurality of fixed stations each configured to receive one of the control posts;
at least one mobile station provided with a platform mounted on hydraulic jacks, wherein the at least one mobile station is mobile according to six degrees of freedom;
a first display mounted on the platform for movement with the at least one mobile station; and
at least one second movable display, wherein the second display is movable to any one of the plurality of fixed stations, wherein at least one of the plurality of control posts is movable between the fixed stations and the at least one mobile station.

2. A system according to claim 1, wherein a control post is mounted on a deck, and said control post is electrically connected to an outside device by way of at least one connecting interface.

3. A system according to claim 1, wherein at least one control post is equipped with means for placing said control post in suspension.

4. A system according to claim 3, wherein the means for placing in suspension include air cushions.

5. A system according to claim 2, wherein the plurality of fixed stations are each equipped with a movable control post, and include a bridge crane equipped with a trolley configured to guide each movable control post.

6. A system according to claim 2, comprising a mobile structure having means for lifting a control post from a fixed station to the at least one mobile station.

7. A system according to claim 6, wherein the mobile structure includes an exterior chassis mounted on air cushions as well as with a chassis movable in translation relative to the exterior chassis and equipped with means for grasping a control post.

8. A system according to claim 1, wherein each fixed station is connected to an operating room, and comprising an extension between each of said plurality of fixed stations and the at least one mobile station.

9. A system of flight simulators, comprising:
at least one mobile station including a platform mounted on jacks, the platform having six degrees of freedom,
a plurality of fixed stations, each equipped with a control post that is movable from a corresponding fixed station to said at least one mobile station, the control post including controls configured to control a flight simulator,
at least one display, and
a bridge crane equipped with a trolley configured to guide each movable control post when moving the movable control post between a fixed station and the at least one mobile station.

10. A system of simulators according to claim 9, wherein each fixed station is configured to accommodate a movable control post and is connected to an operating room, and the system further comprising an extension between each of said fixed stations and the mobile station.

11. A system of flight simulators, comprising:
at least one mobile station,
a plurality of control posts, at least one control post being movable from a first fixed station to a mobile station, the at least one control post including controls configured to control a flight simulator,
at least one display, and
a mobile structure having means for lifting a control post.

12. A system of simulators according to claim 11, wherein the mobile structure includes an exterior chassis mounted on means for placing said exterior chassis in suspension as well as a chassis movable in translation relative to the exterior chassis and equipped with means for grasping a control post.

13. A method of developing the plurality of control posts of claim 1, comprising the following steps:
providing at least one control post on a deck disposed on the first fixed station within a research and design center;
moving the control post from the first fixed station to the mobile station,
performing tests and simulations with said at least one control post on the mobile station, and
returning the control post to the first fixed station.

* * * * *